United States Patent
Sellhusen et al.

(10) Patent No.: US 12,523,521 B2
(45) Date of Patent: Jan. 13, 2026

(54) DETECTION OF UNSECURED LOAD IN AUTOMATICALLY DRIVABLE VEHICLES

(71) Applicant: Robert Bosch GmbH, Stuttgart (DE)

(72) Inventors: Stefan Sellhusen, Sunnyvale, CA (US); Roland Werner, Sindelfingen (DE); Christoph Doerr, Cologne (DE); Florian Dumas, Herrenberg (DE)

(73) Assignee: Robert Bosch GmbH, Stuttgart (DE)

( * ) Notice: Subject to any disclaimer, the term of this patent is extended or adjusted under 35 U.S.C. 154(b) by 94 days.

(21) Appl. No.: 18/005,417

(22) PCT Filed: Jul. 21, 2021

(86) PCT No.: PCT/EP2021/070399
§ 371 (c)(1),
(2) Date: Jan. 13, 2023

(87) PCT Pub. No.: WO2022/018142
PCT Pub. Date: Jan. 27, 2022

(65) Prior Publication Data
US 2023/0273065 A1  Aug. 31, 2023

(30) Foreign Application Priority Data
Jul. 22, 2020 (DE) .................... 10 2020 209 231.1

(51) Int. Cl.
*G01G 19/08* (2006.01)
(52) U.S. Cl.
CPC .................. *G01G 19/086* (2013.01)
(58) Field of Classification Search
CPC .......... G01G 19/086; B60W 2520/105; B60W 2520/125; B60W 40/13; B60K 28/08; B60P 7/06

(Continued)

(56) References Cited

U.S. PATENT DOCUMENTS 10,202,106 B1 * 2/2019 Leone ..................... B60T 8/172
10,586,404 B1   3/2020 Nguyen
(Continued)

FOREIGN PATENT DOCUMENTS

DE   10 2014 226 108 A1   6/2016
DE      102017108034 A1 * 10/2018
(Continued)

OTHER PUBLICATIONS

Kopitch, L. (2011). An analysis of the impact of an incident management system on secondary incidents on freeways—an application to the I-5 in California (Order No. 3490130). (916612877). Retrieved from https://www.proquest.com/dissertations-the (Year: 2011).*

(Continued)

*Primary Examiner* — Ramya P Burgess
*Assistant Examiner* — Keith A von Volkenburg
(74) *Attorney, Agent, or Firm* — Maginot, Moore & Beck LLP

(57) ABSTRACT

Disclosed is a method for detecting an unsecured load in an especially automatically drivable vehicle using a controller, wherein measurement data in the form of lateral accelerations and/or linear accelerations of the vehicle acquired by at least one acceleration sensor are received, a time interval for detecting the unsecured load is started when the measured lateral accelerations or linear accelerations exceed a threshold value, during the time interval started measurement data acquired by at least one sensor are received and derivatives with respect of time of the received measurement data are calculated, an event is counted when the derivatives with respect of time of the measurement data exceed the one threshold value, and the presence of an unsecured load is detected when a minimum number of counted events is reached that are counted during the started time interval.

9 Claims, 2 Drawing Sheets

(58) Field of Classification Search
USPC .......................................................... 701/29.1
See application file for complete search history.

(56) References Cited

U.S. PATENT DOCUMENTS

| | | | |
|---|---|---|---|
| 2014/0214299 A1* | 7/2014 | Risse | B60T 17/221 |
| | | | 701/1 |
| 2018/0246527 A1 | 8/2018 | Anderson et al. | |
| 2018/0276351 A1* | 9/2018 | Patton | G06Q 30/02 |
| 2019/0001863 A1* | 1/2019 | Taylor | H04W 4/70 |
| 2019/0286793 A1* | 9/2019 | Patton | G06F 16/29 |
| 2020/0031284 A1 | 1/2020 | Onica | |
| 2020/0057453 A1* | 2/2020 | Laws | G05D 1/0088 |
| 2020/0108678 A1* | 4/2020 | Pierce | B60D 1/62 |
| 2020/0108810 A1* | 4/2020 | Hara | B60T 8/26 |
| 2020/0226274 A1* | 7/2020 | Juliato | H04L 12/4015 |

FOREIGN PATENT DOCUMENTS

| | | |
|---|---|---|
| DE | 10 2017 212 596 A1 | 1/2019 |
| DE | 10 2018 115 615 A1 | 1/2020 |
| GB | 2569750 A | 6/2019 |
| JP | H9-198575 A | 7/1997 |
| JP | 2012-224270 A | 11/2012 |
| JP | 2014-240211 A | 12/2014 |
| WO | 2011/133091 A1 | 10/2011 |
| WO | 2015/108464 A1 | 7/2015 |

OTHER PUBLICATIONS

International Search Report corresponding to PCT Application No. PCT/EP2021/070399, mailed Oct. 26, 2021 (German and English language document) (5 pages).

Wikipedia: "Ruck," Version 18.12.2019, https://de.wikipedia.org/w/index.php?title=Ruck&oldid&195008689.

* cited by examiner

DETECTION OF UNSECURED LOAD IN AUTOMATICALLY DRIVABLE VEHICLES

This application is a 35 U.S.C. § 371 National Stage Application of PCT/EP2021/070399, filed on Jul. 21, 2021, which claims the benefit of priority to Serial No. DE 10 2020 209 231.1, filed on Jul. 22, 2020 in Germany, the disclosures of which are incorporated herein by reference in their entirety.

The disclosure relates to a method for detecting an unsecured load in a vehicle that can be operated in particular in an automated manner. The disclosure furthermore relates to a controller, to a computer program and to a machine-readable storage medium.

BACKGROUND

When transporting loads in vehicles, proper securing of the load is essential for road safety. In the case of manual or driver-operated vehicles, the load is secured by the driver. The driver assumes the task of securing the load and monitoring the vehicle with regard to a loose load. In particular in the case of vehicles operated in a fully automated manner, however, there is no driver to secure and monitor the load.

Methods for detecting an unsecured load are already known which determine and temporally track a center of gravity of the load. Here, it can be determined whether the center of gravity of the load changes over time and the load thus shifts within a cargo space. Such a method can be used in particular in truck trailers or in containers. The position of the center of gravity can be determined by means of an offset or by means of different loads on the wheels. However, such detection of an unsecured load requires a significant displacement of the load within the cargo space. A slight displacement of the load can be detected only insufficiently.

SUMMARY

The object underlying the disclosure can be seen in proposing a method for precisely detecting a movement of transported goods that are transported by a vehicle operated in an automated manner.

This object is achieved by means of the respective subject matter of the disclosure. Advantageous embodiments are also the subject matter of the disclosure.

According to one aspect of the disclosure, a method for detecting an unsecured load in a vehicle. The vehicle can preferably be designed as a vehicle that can be operated in a fully automated manner. In order to carry out the method, a controller can be used which can be arranged on board or off board the vehicle.

In one step, measurement data in the form of lateral accelerations and/or longitudinal accelerations acquired by at least one acceleration sensor are received. Here, acceleration data of the vehicle are acquired.

In the context of a subsequent evaluation of the measurement data of the acceleration sensor, it is checked whether the measured lateral accelerations or longitudinal accelerations exceed a threshold value. If it is determined that the threshold value has been exceeded, a time interval for detecting the unsecured load is started. The time interval can be initiated immediately or with a time delay.

Subsequently, during the started time interval, measurement data acquired by at least one sensor are received and derivatives with respect to time of the received measurement data are calculated.

If, for example, the derivatives with respect to time of the received measurement data exceed a threshold value, an event is counted. An unsecured load is detected when a minimum number of counted events is reached that are counted during the started time interval.

The method can provide for reliable and sensitive detection of a loosened load in vehicles operated in an automated manner. Individual cases of incorrect detection, which can be caused, for example, by individual potholes, can thereby be avoided. The measurement of kinetic pulses of a load during a defined period of time or during the time interval thus prevents false positive results.

The measurement data of an acceleration sensor can be used as initial triggers for a need to check the securing of the load.

The detection of events during the time interval is no longer limited to the measurement data of the acceleration sensor. Here, different sensors such as microphones, travel sensors of the chassis, sensors of an air suspension and the like can be used to determine events during the time interval. During the activated time interval, the derivatives with respect to time of the received measurement data are used in order to trigger and count events. Here, the derivatives with respect to time of the measurement data provide the differences between the measurement data of two successive points in time and correspond to a tangent gradient of the measurement data plotted in a diagram against time at the respective point in time.

An event may be triggered by a movement of the load and registered based on measurement data from at least one sensor.

According to a further aspect of the disclosure, a controller is provided, wherein the controller is configured to carry out the method. The controller can be, for example, an on-board controller, an off-board controller or an off-board server unit such as a cloud system.

Furthermore, according to one aspect of the disclosure, a computer program is provided which comprises commands which, when the computer program is executed by a computer or a controller, cause this to carry out the method according to the disclosure.

According to a further aspect of the disclosure, a machine-readable storage medium is provided, on which the computer program according to the disclosure is stored.

According to the BASt standard, the vehicle can be operated in an assisted, partially automated, highly automated and/or fully automated or driverless manner.

The vehicle can be, for example, as a passenger car, a truck, a semitrailer, a flatbed truck, a robotaxi and the like. The vehicle is not limited to operation on roads. Rather, the vehicle can also be designed as a watercraft, an aircraft, such as a transport drone, and the like.

According to one exemplary embodiment, when the threshold value is exceeded by the lateral acceleration, the time interval is initiated with a start time with a time offset of $t_0 = \sqrt{b_i a_y}$ and an end time of $t_{end} = \sqrt{3 b_i a_y}$.

Alternatively, when the threshold value is exceeded by the longitudinal acceleration, the time interval is initiated with a start time with a time offset of $t_0 = \sqrt{l_i a_x}$ and an end time of $t_{end} = \sqrt{l a_x}$.

Here, the time offset of the start time on the respective acceleration in the lateral direction or longitudinal direction and the dimensions of the vehicle's cargo space in the corresponding direction. Thus, a length of the cargo space is relevant in the case of a determined longitudinal acceleration and a width of the cargo space is relevant in the case of a determined lateral acceleration of the load.

The cargo space can be positioned in the vehicle itself, such as in a trunk or a rear seat bench, in a structure on the vehicle, on a roof rack or roof box, in a trailer, in a semitrailer and the like.

According to a further embodiment, the derivatives with respect to time of the measurement data are calculated by at least one differentiator. The differentiator can be designed in the form of hardware or software. The measurement data are fed to an input of the differentiator or of the differentiator amplifier. An output of the differentiator then provides temporal change or derivatives with respect to time of the measurement data. As a result of this measure, events during the started time interval can be registered in a technically simple manner.

According to a further exemplary embodiment, measurement data from at least one acceleration sensor, sound sensor, sensor of an air suspension of the vehicle, microphone and/or travel sensor, for example a travel sensor of a wheel suspension of the vehicle, are received during the started time interval. As a result, the securing of the load is checked based on measurement data from different sensors. The method can thereby be realized with the aid of a wide variety of sensors.

According to a further embodiment, when the minimum number of counted events that are counted during the started time interval is reached, control commands for outputting a warning message are generated. With this measure, a teleoperator of the vehicle or of a vehicle fleet can be notified by the controller if an unsecured or loose load has been registered in at least one vehicle.

The warning message can be transmitted using a communication connection. The communication connection may, for example, be based on wireless transmission technology. In particular, the warning message can be sent using a WLAN, UMTS, GSM, 5G or similar transmission standard.

According to a further exemplary embodiment, when the minimum number of counted events that are counted during the started time interval is reached, the vehicle is brought to a safe state and/or vehicle dynamics are reduced. Depending on the design of the vehicle and the load, a reduction in the vehicle dynamics can already be sufficient to ensure safe transport.

If the load is particularly sensitive or has a high mass compared to the vehicle, bringing the vehicle to a safe state can be advantageous if there is no load securing, in order to exclude a risk to road traffic. For this purpose, the vehicle can be parked at the roadside or driven to the next parking space or rest stop.

A vehicle with an unsecured load that has been brought to a safe state can then be inspected. In this case, the loosened load of the vehicle can be secured manually and further travel of the vehicle with the load can be ensured.

BRIEF DESCRIPTION OF THE DRAWINGS

Preferred exemplary embodiments of the disclosure are explained in more detail below with reference to highly simplified schematic representations. In the drawings:

FIG. 1 shows a plan view of a vehicle 1 with a cargo space 2 for illustrating a method 4 according to one embodiment. The method 4 is explained in more detail in FIG. 2.

Figure 1:
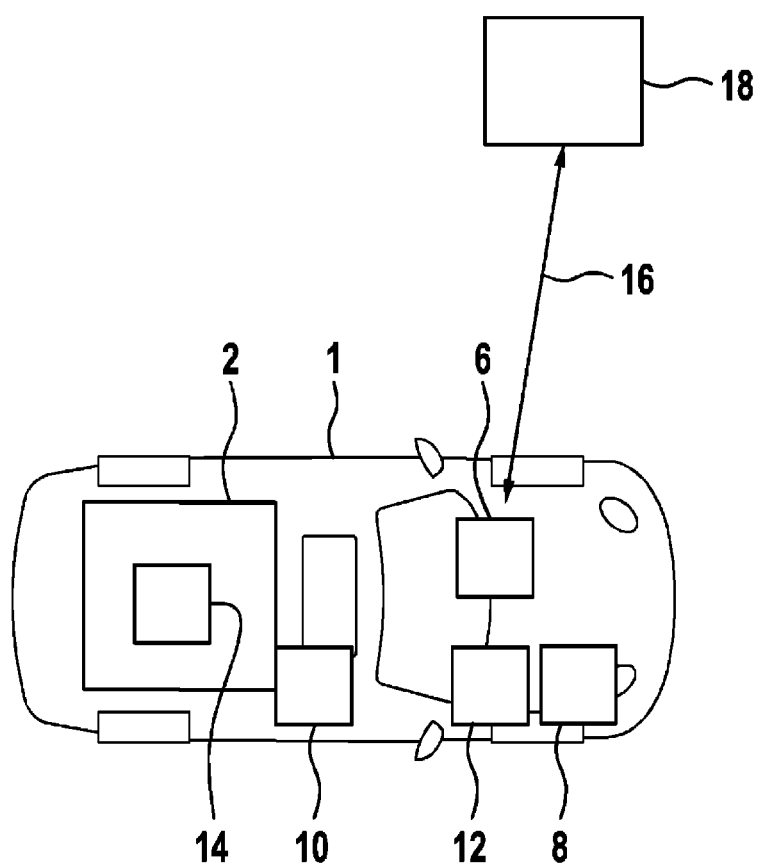
FIG. 1 shows a plan view of a vehicle having a cargo space for illustrating a method according to one embodiment.

The vehicle 1 has a controller 6 which can receive and evaluate measurement data from different sensors 8, 10, 12. For example, the vehicle 1 can have an acceleration sensor 8, which can use measurement data for an initial load securing check. The acceleration sensor 8 can be arranged, for example, in the chassis of the vehicle 1.

In the cargo space of the vehicle 1, a transport item or a load 14 is located for example. In the exemplary embodiment shown, the cargo space 2 is designed in the form of a rear seat bench or trunk of the vehicle 1. According to the BASt standard, the vehicle 1 can be designed as a fully automated vehicle and thus operated without a driver.

A further sensor 10 can be designed, for example, as a microphone or interior microphone. Furthermore, measurement data from sensors 12 configured as travel sensors can be received by the controller 6.

The controller 6 can furthermore establish a communication connection 16 with a teleoperator 18.

DETAILED DESCRIPTION

In the exemplary embodiment shown, the communication connection 16 can be designed in the form of an LTE or WLAN connection. In particular, the communication connection 16 can be used to receive instructions or to transmit warning messages.

Figure 2:
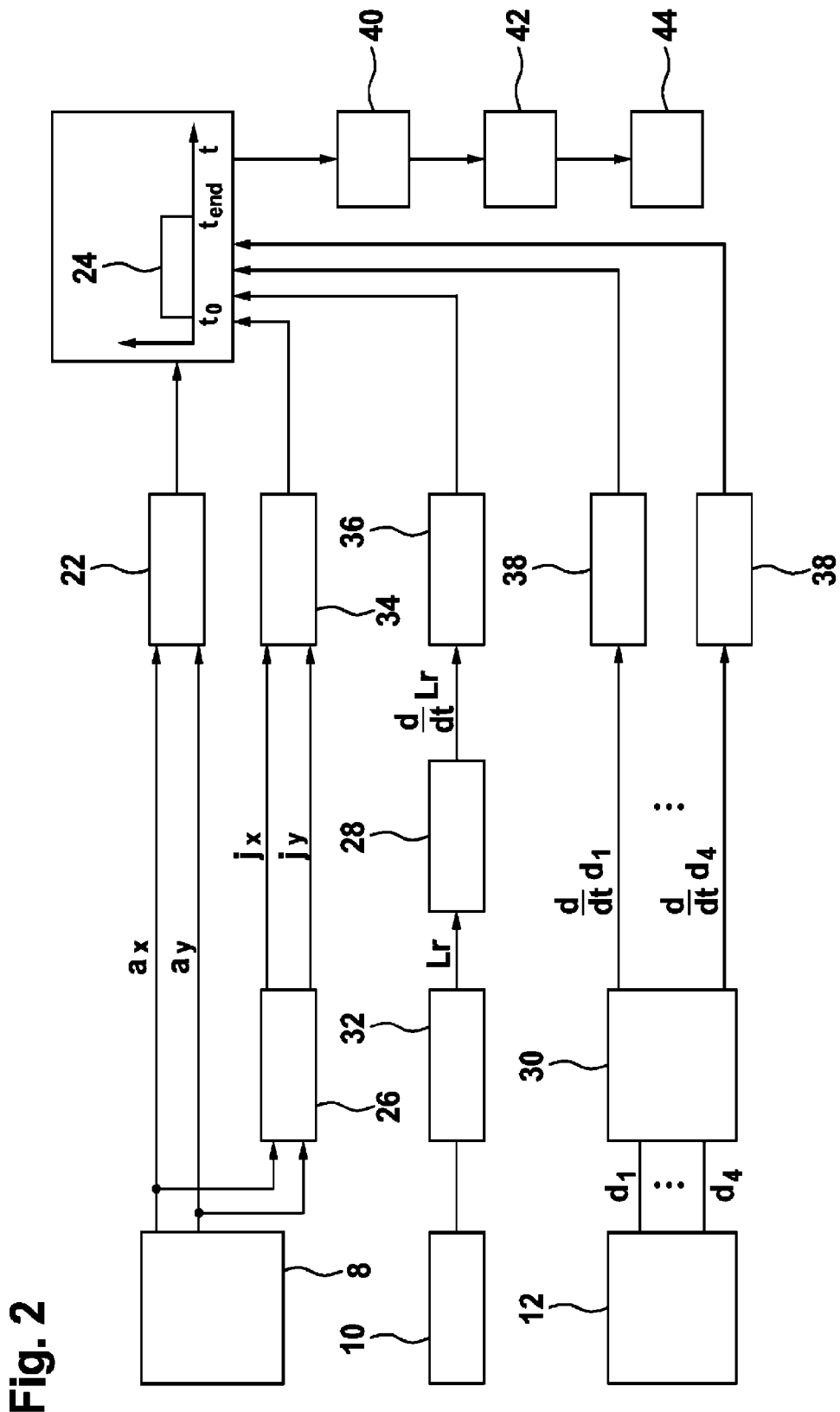
FIG. 2 shows a schematic flowchart for illustrating the method according to one embodiment.

FIG. 2 shows a schematic flowchart for illustrating the method 4 according to one embodiment. The method 4 is used to detect an unsecured load 14 in a vehicle 1 and can preferably be carried out by a controller 6.

The method 4 can substantially be divided into several stages. In a first stage, a time interval in which events are counted is opened.

Based on the counted events collected during a second stage, an unsecured or loose load 14 can be detected.

The third stage of the method 4 is designed to generate a response to a determined unsecured load 14. A response can be realized, for example, in the form of a warning message and/or by bringing the vehicle 1 to a safe state.

In a first step 20, measurement data in the form of lateral accelerations $a_y$ and/or longitudinal accelerations $a_x$ acquired by at least one acceleration sensor 8 are received.

The acquired measurement data are compared with a predefined threshold value by a threshold value detection 22. The threshold value can be defined in advance as part of a calibration.

If a threshold value is exceeded by the measured lateral accelerations $a_y$ and/or longitudinal accelerations $a_x$, a time interval 24 for detecting the unsecured load 14 is started within the scope of an event counting period.

The threshold value can be exceeded, for example, if the unsecured load 14 is pushed against the cargo space 2 of the vehicle 1. The time interval 24 can have an immediate start time or a delayed start time $t_0$. Accordingly, the time interval 24 can have an adjusted end time $t_{end}$.

The start time $t_0$ and the end time $t_{end}$ can be calculated according to the following formulas:

$$t_0 = \sqrt{b_i a_y} \text{ and } t_{end} = \sqrt{3 b_i a_y}$$

if the lateral acceleration $a_y$ has exceeded the threshold value.

$$t_0 = \sqrt{l_i a_x} \text{ and } t_{end} = \sqrt{3 l_i a_x}$$

if the longitudinal acceleration $a_x$ has exceeded the threshold value. In this case, $b_i$ equals a width of the cargo space 2, and $l_i$ equals a length of the cargo space 2.

For example, in the middle of the event counting window or of the time interval 24, the point in time at which a loose object or the load 14 in the case of an applied lateral acceleration $a_y$ can shift from a left to a right interior side of the cargo space 2 and hit the wall there.

During the started time interval 24, measurement data acquired by at least one sensor 8, 10, 12 are received and temporal changes or time derivatives 26, 28, 30 of the received measurement data are calculated. This can be implemented by a plurality of differentiator amplifiers 26, 28, 30, which are integrated, for example, into the controller 6.

Each sensor 8, 10, 12 can have a separate differentiator amplifier 26, 28, 30, which transforms the corresponding measurement data into derivatives with respect to time of the measurement data.

Measurement data from a plurality of travel sensors 12 of the wheel suspension are evaluated. For example, each of the four wheel suspensions can have its own travel sensor 12. The respective path sensors 12 can acquire measurement data in the form of paths or routes $d_1$, $d_2$, $d_3$, $d_4$.

The at least one interior microphone 10 can acquire measurement data in the form of sound signals which are converted to sound pressure levels $L_p$ by means of a sound pressure level calculation 32.

The respective temporal measurement data are then temporally derived 26, 28, 30 during the active time interval 24. As a result of the derivative 26 of the lateral accelerations $a_y$ and/or longitudinal accelerations $a_x$ with respect to time, a jerk $j_y$ is produced in the lateral direction and/or a jerk $j_x$ is produced in the longitudinal direction.

Subsequently, the derivatives with respect to time of the measurement data are subjected to a threshold value detection 34, 36, 38. If the derivatives with respect to time of the received measurement data exceed a threshold value, an event is counted.

The counting of the events can take place using an event counter 40 which is active during the time interval 24.

An unsecured load is detected when a minimum number 42 of counted events is reached that are counted during the started time interval 24.

If an unsecured load is detected, a response 44 can be initiated by the controller 6. For this purpose, the controller 6 can generate control commands which generate a warning message or which can bring the vehicle 1 into a secure state.

The invention claimed is:

1. A method for detecting an unsecured load in a vehicle that can be operated in an automated manner, the method comprising:
receiving, with a controller of the vehicle, at least one of lateral accelerations and longitudinal accelerations of the vehicle acquired by at least one acceleration sensor;
starting, with the controller, a time interval in response to a threshold value being exceeded by one of the lateral accelerations and the longitudinal accelerations, the starting including calculating a start time and an end time of the time interval;
receiving, with the controller, during the time interval, measurement data acquired by at least one sensor and calculating, with the controller, derivatives with respect to time of the received measurement data;
counting, with the controller, an event in response to the derivatives with respect to time of the received measurement data exceeding the threshold value;
detecting, with the controller, the unsecured load in the vehicle in response to a minimum number of events being counted during the time interval; and
autonomously operating, with the controller, the vehicle to at least one of (i) bring the vehicle to a stop or (ii) reduce vehicle dynamics in response to detecting the unsecured load.

2. The method according to claim 1, wherein the time interval one of (i) has a start time with a time offset of $t_0=\sqrt{b_i a_y}$ and an end time of $t_{end}=\sqrt{3 b_i a_y}$ when the threshold value is exceeded by the lateral acceleration, and (ii) has a start time with a time offset of $t_0=\sqrt{l_i a_x}$ and an end time of $t_{end}=\sqrt{3 l_i a_x}$ when the threshold value is exceeded by the longitudinal acceleration, where l is a length of a cargo space, b is a width of the cargo space of the vehicle, $a_x$ is the longitudinal accelerations, and $a_y$ is the lateral accelerations.

3. The method according to claim 1, the calculating further comprising:
calculating the derivatives with respect to time of the measurement data using at least one differentiator.

4. The method according to claim 1, the receiving measurement data further comprising:
receiving, during the time interval, the measurement data from at least one of the at least one acceleration sensor, a sound sensor, a microphone, and a travel sensor.

5. The method according to claim 1 further comprising:
in response to the minimum number of events being counted during the time interval, generating control commands configured to output a warning message.

6. The method according to claim 4, wherein the travel sensor is a travel sensor of a wheel suspension of the vehicle.

7. A controller for detecting an unsecured load in a vehicle that can be operated in an automated manner, the controller being configured to:
receive measurement data including at least one of lateral accelerations and longitudinal accelerations of the vehicle acquired by at least one acceleration sensor;
start a time interval in response to a threshold value being exceeded by one of the lateral accelerations and the longitudinal accelerations, the start of the time interval including calculating a start time and an end time of the time interval;
during the time interval, receive measurement data acquired by at least one sensor and calculate derivatives with respect to time of the received measurement data;
count an event in response to the derivatives with respect to time of the received measurement data exceeding the threshold value;
detect the unsecured load in the vehicle in response to a minimum number of events being counted during the time interval; and
autonomously operate the vehicle to at least one of (i) bring the vehicle to a stop or (ii) reduce vehicle dynamics in response to detecting the unsecured load.

8. The controller according to claim 7, wherein the controller executes a computer program stored on a non-transitory machine-readable storage medium.

9. A non-transitory machine-readable storage medium that stores a computer program for detecting an unsecured load in a vehicle that can be operated in an automated manner, the computer program comprising commands that, when executed by one of a computer and a controller, cause the one of the computer and the controller to:
receive measurement data including at least one of lateral accelerations and longitudinal accelerations of the vehicle acquired by at least one acceleration sensor;

start a time interval in response to a threshold value being exceeded by one of the lateral accelerations and the longitudinal accelerations, the starting including calculating a start time and an end time of the time interval;

during the time interval, receive measurement data acquired by at least one sensor and calculate derivatives with respect to time of the received measurement data;

count an event in response to the derivatives with respect to time of the received measurement data exceeding the threshold value;

detect the unsecured load in the vehicle in response to a minimum number of events being counted during the time interval; and autonomously operate the vehicle to at least one of (i) bring the vehicle to a stop or (ii) reduce vehicle dynamics in response to detecting the unsecured load.

* * * * *